July 23, 1968  F. C. MARTIN  3,393,408

RODENT BARRIER ATTACHMENT FOR WATER CLOSETS

Filed May 1, 1967  3 Sheets-Sheet 1

FRANK C. MARTIN INVENTOR.

BY George R Nimmer
ATTORNEY

July 23, 1968  F. C. MARTIN  3,393,408
RODENT BARRIER ATTACHMENT FOR WATER CLOSETS
Filed May 1, 1967  3 Sheets-Sheet 2

FRANK C. MARTIN  INVENTOR.

BY George R Nimmer

ATTORNEY

July 23, 1968     F. C. MARTIN     3,393,408

RODENT BARRIER ATTACHMENT FOR WATER CLOSETS

Filed May 1, 1967     3 Sheets-Sheet 3

FRANK C. MARTIN    INVENTOR

BY George R. Nimmer

ATTORNEY

United States Patent Office 3,393,408
Patented July 23, 1968

3,393,408
RODENT BARRIER ATTACHMENT FOR WATER CLOSETS
Frank C. Martin, Omaha, Nebr., assignor of one-third to George R. Nimmer, and two-thirds to Frank C. Martin and Etta S. Martin, all of Omaha, Nebr., as joint tenants
Continuation-in-part of application Ser. No. 486,432, Sept. 10, 1965. This application May 1, 1967, Ser. No. 658,011
11 Claims. (Cl. 4—1)

ABSTRACT OF THE DISCLOSURE

This invention provides a rodent barrier attachment device that may be easily removably inserted into the discharge channel of a conventional water closet so as to prevent ingress of sewer dweller rodents into the water closet without impairing the normal function of the water closet.

---

This application is a continuation-in-part of my co-pending patent application Ser. No. 486,432, filed Sept. 10, 1965, now abandoned.

Municipal sewer systems comprise a network of interconnected sewer pipes carrying semi-solid, liquid and slurrified refuse from individual domestic and industrial buildings to a disposal site, e.g. a municipal sewage disposal plant. It is well known that hydrophilic rodents, e.g. sewer rats, infest and even inhabit sewer lines of municipal sewer systems. Sewer dwelling rodents derive their sustenance from semi-solid and slurrified sewer refuse which includes residue from food cleaning operations, from dish washing operations, and even from partially decomposed human and animal excrements. Particularly because of the presence of biological excrements within the sewer lines, these sewer rodents become carriers of rabies and other pathological diseases.

There is usually the presence of sufficient air all along the sewer system to permit the sewer rodents to maneuver and travel throughout the entire system, even into the bathrooms and basements of residential homes. Indeed there are many recorded cases wherein sewer rats have emerged from the sewer line into the bathroom water closet, i.e. toilet stool, to frighten and endanger the occupants. The larger sewer rats are especially vicious and are oftentimes sufficiently energetic to escape from the water closet and thus be free to terrorize human occupants of the other dwelling rooms as well.

The presence of sewer rats is not restricted to the so-called slum areas. There has been an increasing prevalence among all neighborhoods, particularly in those neighborhoods having a large number of kitchen sink garbage disposals. With the increasing popularity of kitchen garbage disposals, more edible wastes are being delivered directly into the sewer lines so as to sustain even greater numbers of sewer rodents.

The discharge channel of conventional water closets presents one of the few unobstructed accesses from the sewer into the residential dwelling, and it is at this point that this invention is concerned. There are in the prior art water closets having an integral one-way valve built into the water closet discharge channel throat; while these prior art one-way valves are designed to prevent water back-up, they are inherently adapted to prevent the ingress of rodents as well. However, very few water closets presently installed are of the type having the one-way water valve and it would be an expensive matter to replace the entire water closet simply to secure a one-way valve to act as a rodent barrier.

It is accordingly an object of the present invention to provide a rodent barrier device that may be conveniently, easily, and removably attached into the discharge channel throat of a bathroom water closet.

It is another object of the present invention to provide a rodent barrier attachment that will permit egress of flushed water closets debris, including paper, solids, liquids, and slurrified wastes, while normally preventing ingress of a sewer dweller rodent into the water closet bowl.

It is another object of the present invention to provide a rodent barrier attachment that may be readily insertably installed into the water closet discharge throat without the necessity for special installation tools.

It is yet another object of the present invention to provide a rodent barrier attachment that is adapted for various cross-sectional sizes and inclines of water closet throats.

It is still another object to provide a rodent barrier attachment that is relatively inconspicuously positioned within the water closet discharge channel so as not to spoil the aesthetic appearance of the interior bowl portion thereof.

It is another object to provide a rodent barrier attachment that will not snag or otherwise become soiled with water closet papers and other solid or slurried refuse.

It is another object to provide a rodent barrier attachment that may be readily removed for cleaning purposes if this should become necessary.

It is another object to provide a rodent barrier attachment that is chemically inert to water closet wastes and to water closet cleaning compounds.

It is another object to provide a rodent barrier attachment that is economical to manufacture, durable, exceedingly simple to use, and having a minimum number of mechanical parts.

With the above and other objects in view, which will appear as the description proceeds, this invention resides in the novel construction, combination, and arrangement of parts substantially as hereinafter described and more particularly defined by the appended claims, it being understood that such changes in the precise embodiment of the hereindisclosed invention may be made as come within the scope of the claims.

In the drawing, wherein like numbers refer to like parts in the several views and in which:

FIGURE 1 is a top plan view of a conventional type of water closet having a substantially vertical lower opening. A minor portion of a rodent barrier attachment for the water closet is shown positioned within the lower opening of the water closet.

FIGURE 2 is a sectional elevational view of the water closet and embodiment 10 of the installed rodent barrier attachment taken along line 2—2 of FIGURES 1 and 4.

Figure 2:
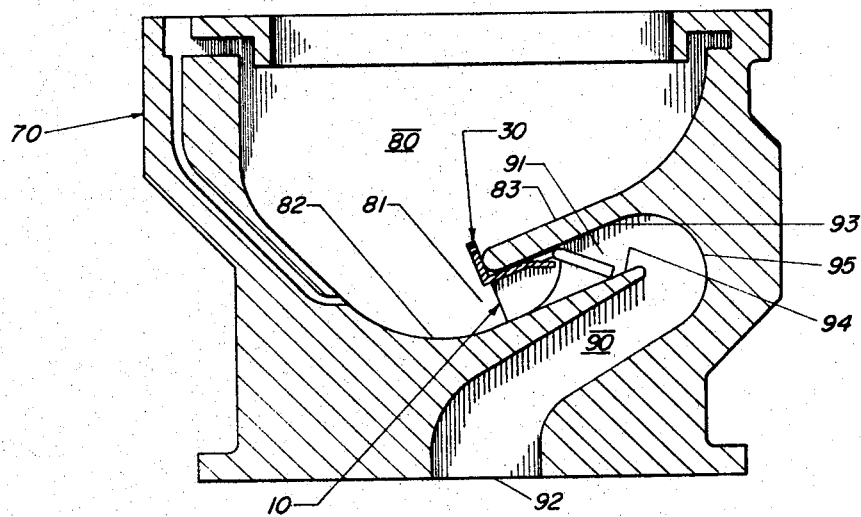

The rodent barrier attachment device e.g. 10, 100, 200, 300, is readily employed in conjunction with a conventional water closet 70 comprising a bowl portion 80 and a serpentine discharge channel 90 of substantially circular cross-sectional shape, said channel 90 intersecting or communicating with bowl 80 at a substantially vertical lower opening 81. The initial or "throat" portion 91 slopes upwardly to provide a sump-like floor 82 within bowl 80, said sump 82 when filled with water providing a trap to prevent ingress of sewer gas from channel outlet 92. A shelf portion e.g. 83, 283, of the water closet provides both the forward sloping portion of bowl 80 as well as the upper wall or roof 93 of throat 91. For the prevalent curvilinear throat configuration, the upper quadrant that merges with the bowl shelf portion is defined as the roof, the lower quadrant that merges with the bowl sump-like floor as the floor, and the sideward or lateral quadrants of the throat as the sides thereof.

Figure 3:
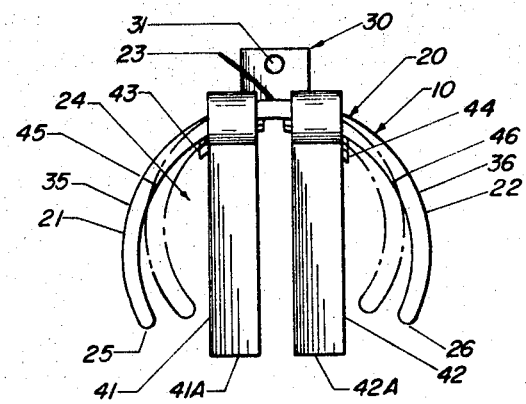
FIGURE 3 is a front elevational view of the embodiment 10 of the rodent barrier attachment for water closets.
Figure 1:
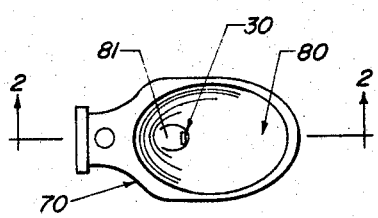

The preferred rodent barrier attachment as embodiment 10 comprises an elongate collar member 20, an upright tab supplemental retention means 30, and at least one pivotal tongue e.g. 41. Elongate collar member 20 has two downwardly extending legs 21 and 22 and an intervening substantially horizontal transverse web 23, said two legs and intervening web being integrally joined together to provide an inverted-U cross-sectional shape. At least one of legs 21 and 22 of collar member 20 is resiliently flexible toward the other in spring-like fashion, said resiliently flexible legs promoting secure springy engagement of rodent barrier attachment 10 against sidewalls of throat 91. To attain the springy engagement between attachment 10 and throat 91, the collar's opposed legs 21 and 22 at the "normal" or unflexed condition must be so transversely spaced apart that the greatest transverse distance between the legs' convex outer surface 35 and 36 exceeds the greatest transverse distance between the throat's opposed convex sidewalls. In order to permit ready one-handed insertion i.e. installation, of attachment device 10 into throat 91, springy legs 21 and 22 are flexible toward each other (as indicated in phantom line in FIGURE 3) under that pressure typically exertable between the thumb and the index and middle fingers. Upon release of said manual external pressure, legs 21 and 22 will resiliently reflex or spring outwardly from each other (approaching though not fully-re-attaining their "normal" unflexed condition) to forceably bear against the throat's opposed sidewalls. Thus, the unrelieved stress within legs 21 and 22 exert springy pressure against the throat's sidewalls. To provide resiliently flexible springy legs 21 and 22, the entire collar 20 (including web 23 and legs 21–22) is preferably formed of a structurally continuous material e.g. molded organic resin, formed sheet metal, etc.

Because the opposed sidewalls of throat 91 are normally curvilinearly concave, the outward surfaces 35 and 36 of legs 21 and 22 are preferably curvilinearly convex to attain a high degree of surface contact with the throat's sidewalls. In order that collar 20 will not obstruct the flushing of semi-solid toilet debris through throat 91, the collar web and legs must be as thin as structurally possible to provide the maximum cross-sectional size for collar interior opening 24. If a flat strip of resiliently flexible sheet metal is curvedly formed into a collar member 20 having curvilinear convex outward surfaces 35 and 36 for legs 21 and 22, the inward surfaces of said legs are respectively curvilinearly concave and parallel to the outward surfaces, thus providing a large cross-sectional interior opening 24. A curvedly formed strip of sheet metal provides an exceedingly economical collar member 20, the web and legs of which have curvilinear inward and outward contours.

Collar member 20 has a rearward end 27 and a forward end 28. The lower termini 25 and 26 of legs 21 and 22, respectively, are spaced apart a finite distance. Further, the lower portions of legs 21 and 22 are preferably inwardly convergent. Because of the upwardly sloping nature of throat 91, particularly of its inclined floor 94, the forward ends of legs termini 25 and 26 tend to bind or dig into floor 94, thus making insertion of collar 20 into throat 91 extremely difficult. This tendency can be nullified in one of two ways: provide collar 20 (including legs 21 and 22) of a resinous material; or, if a sheet metal collar (including legs 21 and 22) is employed, the legs are tapered so that their forward lower termini 45 and 46 are either rounded or truncated so as to prevent digging or binding into channel floor 94.

In order that collar 20 will not obstruct flow of toilet bowl residues through throat 91, it is further necessary that the entire length of intervening web 23 be located as close as possible to the inclined roof 93 of throat 91. Thus, it is desirable that at least a portion of legs 21 and 22 rest against throat floor 94 and be of sufficient length to elevate web 23 adjacent to roof 93. Further, in the case of curvilinearly contoured collars especially, the forwardly extending elongate length of its intervening web should not be substantially longer than the distance between throat floor 94 and throat roof 93. Otherwise, the forward portion of intervening web 23 will act as an oblique dam across throat 91. For reasons to be explained later, the average elongate length of collar 20 (regardless of its specific contour) should exceed at least one half the distance between floor 94 and roof 93.

The unrelieved stress or spring tension of legs 21 and 22 bearing against the sidewalls of throat 91, together with the convex contour of legs 21 and 22 against the concave sidewalls of throat 91, provides a frictional retention means between the legs' outward surfaces 35 and 36 and the opposed throat sidewalls to retain attachment 10 near throat opening 80. Yet, because of the slickness of the throat sidewalls due to the water necessarily carried by said throat 91, there is some tendency for toilet debris to carry the device 10 along the channel 90 to an inaccessible portion thereof as, for example, against the turnaround 95. There are several ways to ensure retention of device 10 near throat opening 81, yet within throat 91. For example, the legs' outward surface 35 and 36 can be knurled or otherwise roughened so as to increase the coefficient of friction between collar 20 and the throat lateral sidewalls. However, a tab-like auxiliary retention means extending outwardly of the collar opening 24 is desirable; herein employed is a tab 30 uprightly attached to the web of collar 23, nearer to collar rearward end 27 than to forward end 28. Preferably, tab 30 is rearwardly off-set of rearward end 27 so that, when tab 30 abuts the rearward terminus of shelf 83, collar 20 is securely positioned wholly within throat 91 to enhance aesthetic appearance of bowl 80 and to prevent snagging of debris along collar rearward end 27. Further, upright tab 30 provides a convenient means to remove attachment device 10 from channel throat 91 so as to facilitate cleaning and/or mechanical adjustment of device 10, if either operation should ever be required. Tab 30 may conveniently possess a perforation 31 therethrough so that device 10 may be readily removed with a hook-like tool (not shown) because the tab is normally slippery because of the water environment. Obviously, tab 30 and collar member 20 can be conveniently and economically formed of a structurally continuous material e.g. molded organic resin, a strip of sheet metal etc. If sheet metals are to be employed, those which are resistant to rust and/or corrosion e.g. "stainless steel," are preferred.

Pivotably attached to the forward end of web 23 of collar 20 is at least one tongue member. Conveniently herein two pivotal tongues 41 and 42 are employed, each tongue having a free end e.g. 41A and 42A, remote of the tongue member's pivotal attachment to collar member 20. In order that debris may be flushed through collar opening 28, the tongues must readily open forwardly upon being subjected to rearward pressure of flushed toilet debris. In fact, it is desirable that tongues 41 and 42 be so freely pivotal that under normal debris pressure they will assume a substantially parallel relationship with channel roof 93 and with the longitudinal central axis of web 23. A good indication of this required pivotal freedom is to remove the device 10 from throat 91 and vertically support collar 20 from its rearward end 27 so that collar legs and web are vertical; in this position, acceptable pivotal tongues will assume substantially vertical positions.

While rod-like pivotal tongues will normally respond to rearward debris pressure, plate-like pivotal tongues that are transversely wider than their thickness are even more responsive to rearward debris pressure. Straight plate-like pivotal tongues of the type shown in the drawing may be readily formed of sheet metal, preferably "stainless steel," and pivotably attached to web 23 by bending the sheet metal plate through suitable rectangular perforations in web 23.

A hydrophilic rodent is commonly able to exert considerable forward pressure upon the pivotal tongues, especially when bracing his rear legs against channel wall 95. In order to prevent a rodent from squirming between the tongue's lower ends 41A and 42A, the distance between the tongues' lower ends and the throat floor must not exceed about ¾ inch. Thus, it is necessary to provide a restraining means to limit the pivotal motion of tongues 41 and 42 toward the bowl lower opening 81 and rearward end 27. In no event should the angle between straight tongues e.g. 41 and 42, and collar web 23 be less than 45°. The preferred restraining means are as web stops 43 and 44, or lengthy tongues adapted to rest upon throat floor 94 forwardly of web 23 when the device 10 is installed, or a combination of both.

The web stops 43 and 44 are as integral collar projections on the inward surface of web 23 rearwardly of tongues 41 and 42, respectively. If collar 20 is formed of sheet metal, the projections are conveniently provided as a three-sided incision through metallic web 23, said metal being bent inwardly of web 23 to form a tab, the inward free end of the tab-like web stop being adjacently rearward of a pivotal tongue to provide a rearward restraining means for the pivotal tongue.

An alternate type restraining means requires that the lengths of the respective pivotal tongues exceed the maximum vertical height of collar 20, for example, at its rearward end 27 between web 23 and leg terminus 25 or 26. Further, the lengths of the respective pivotal tongues must exceed the vertical height of throat 91 between floor 94 and roof 93. When the tongue lengths exceed these values, the lower ends 41A and 42A of the pivotal tongues 41 and 42, respectively, rest upon throat floor 94 forwardly of collar member forward end 28. Thus, if a rodent were to encounter a forwardly extending tongue resting upon throat floor 94, the floor 94 would prevent the tongue from being pivoted rearwardly. The rodent's forward pressure upon the tongues causes collar 20 to tilt downwardly and tend to rotate within throat 91; unless the average elongate length of collar 20 exceeds about one-half of the maximum vertical height of collar 20, the device 10 could be rolled outwardly of throat 91 into bowl 80. In order that the forwardly extending pivotal tongues provide a rigid bow-free rodent barrier, it is desirable that the respective tongues not exceed twice the vertical height between floor 94 and roof 93, said throat vertical height being substantially equal to the rearward vertical height of the collar member 20.

While two pivotal tongues have been shown in the drawing, obviously any convenient number of pivotal tongues could be employed. For example, a single plate-like tongue having a transverse width substantially coextensive with collar opening 24 has been successfully employed as in embodiments 100, 200, and 300. Whatever the number of transverse widths of the respective pivotal tongues, it is essential that none of the openings between the respective tongues or between a tongue and a throat wall exceed about ¾ inch, at least this size opening being required to permit passage of a typical sewer-dweller rodent.

Although barrier attachment device 10 can be readily removed from throat 91 for cleaning should any flushed debris be snagged thereby, it is desirable to fabricate the device so as to minimize the possibility of such troublesome and offensive snagging. As has already been mentioned, the interior opening 24 of collar 20 should be as large as possible, the rearward end 27 of collar 20 should be disposed wholly within throat 91, and the forwardly extending elongate length of web 23 should not be excessive. The inward surfaces of collar 20 should be free of vertical or rearwardly-extending projections. Web tabs 43 and 44 are not apt to snag debris because these inward projections extend in the forward direction. Similarly, the inward or rearward surface of the pivotal tongues should also be free of vertical and rearwardly-extending projections when the tongues are parallel to web 23 and throat floor 94. Specifically, the rearward surface of the pivotal tongues should be smooth linearly generated configuration and preferably of a curlinearly concave configuration.

Having now described in detail the essential technological features of the removably attachable rodent barrier device in the form of preferred embodiment 10, the closely related embodiments 100 and 200 will now be described.

Figure 6:
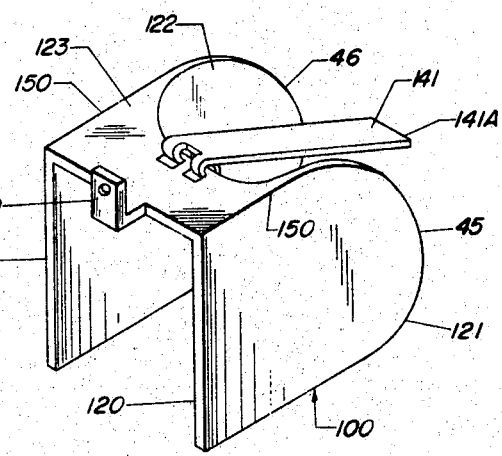
FIGURE 6 is a perspective view of embodiment 100 of the rodent barrier attachment of the present invention.
Figure 7:
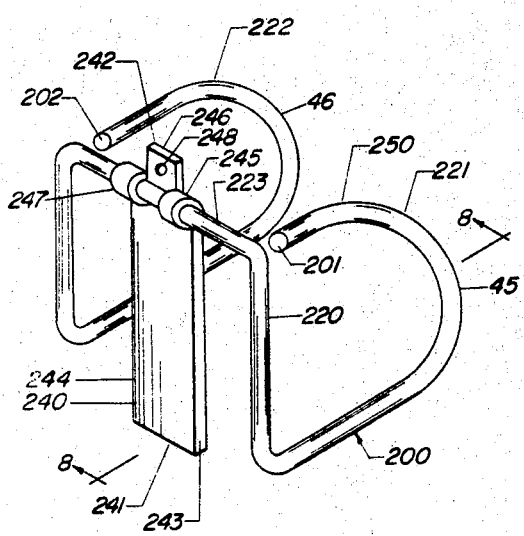
FIGURE 7 is a perspective view of embodiment 200 of the rodent barrier attachment of the present invention.

Embodiment 100 of FIGURE 6 differes from that of embodiment form 10 in three principal respects. First, embodiment 100 employs but one pivotal tongue 141 that is pivotably attached near the forward end of collar member web 123; the transverse width of sole pivotal tongue 141 spans a major portion of the transverse distance between collar member legs 21 and 22. Secondly, the restraining means to limit the pivotal motion of the pivotal tongue, e.g. 141, toward the collar rearward end 27 of the removably installed device, e.g. 100, is the extensive length of tongue 141 between its lower end 141A and its upper end at collar web 123, the said tongue length exceeding by at least 10% the maximum vertical height of collar 120 whereby tongue forward end 141A is adapted to rest upon throat floor 94 forwardly of web 123 when device 100 is installed; with such a lengthy tongue, a web stop restraining means 43 or 44 is not necessitated. Thirdly, the front to rear length of web 123 is drastically less than the front to rear length of collar member legs 121 and 122. However, the average front to rear length of collar member 120 exceeds at least one-half the maximum vertical height of collar 120 so as to prevent device 100 from being rolled outwardly from throat 91 into bowl 80 by an aggressive rodent. When abbreviated webs, e.g. 123, 223, are employed, the elongate upper portions e.g. 150, 250, of the collar must exceed at least one-half the maximum vertical height of the collar member, or alternatively at least one-half the roof-to-floor height of discharge channel 91, in order to prevent outward rolling of the installed device into the toilet bowl by an aggressive rodent.

Embodiment 200, so far as the collar member 220 is concerned, closely resembles that of collar member 120 of FIGURE 6. However, collar member 220 is of a skeletal outlined nature comprising a single length of normally-springy, but permanently bendable, rod stock having a uniform cross-sectional size and shape, herein as circular. The bendably formed rod stock comprising collar member 220 has a first terminal end 201, a second terminal end 202, and an intermediate transverse portion 223 that provides the collar member web. That D-shaped looped portion of the bendably formed rod stock between its first terminal end 201 and intermediate portion 223 provides the collar member first leg 221 while a second D-shaped looped portion of the same rod stock between its second treminal end 202 and intermediate portion 223 provides the collar member second leg 222.

The pivotal tongue component 240 of embodiment 290 may include a tab portion 246 having a function analogous to the upright tab 30 which has been integrally attached to the plate-like webs 23 and 123 of embodiments 10 and 100, respectively. However, because the web 223 of embodiment 200 is of a symmetrical (herein as a circular) cross-sectional shape and located at the collar member rearward end 27, it is possible to have the tab 246 as an integral portion of the pivotal tongue 240 rather than as an integral portion of the collar member web. Specifically, pivotal tongue 240 may be formed of a single rectangular strip of permanently bendable springy sheet metal having a first lower transverse end 241 that provides the free lower end thereof, a second upper transverse end 242, and a pair of opposed elongate edges 243 and 244. Tongue 240 includes two parallel incisions therethrough commencing at upper transverse end 242 to provide three fingers 245–247 at tongue upper second end 242. The first and third fingers 245 and 247 are permanently bent around rodlike transverse web 223 to provide the pivotal connection between collar member web 223 and pivotal tongue 240. The upwardly-extending second finger 246 is adapted to abut the rearward terminus 284 of the toilet bowl shelf member, e.g. 83, 283, to ensure retention of the installed embodiment in the toilet bowl discharge channel. Tongue-tab 246 may be provided with perforation 248, analogous to perforation 31, to facilitate removal of embodiment 200 from throat 291.

Figure 5:
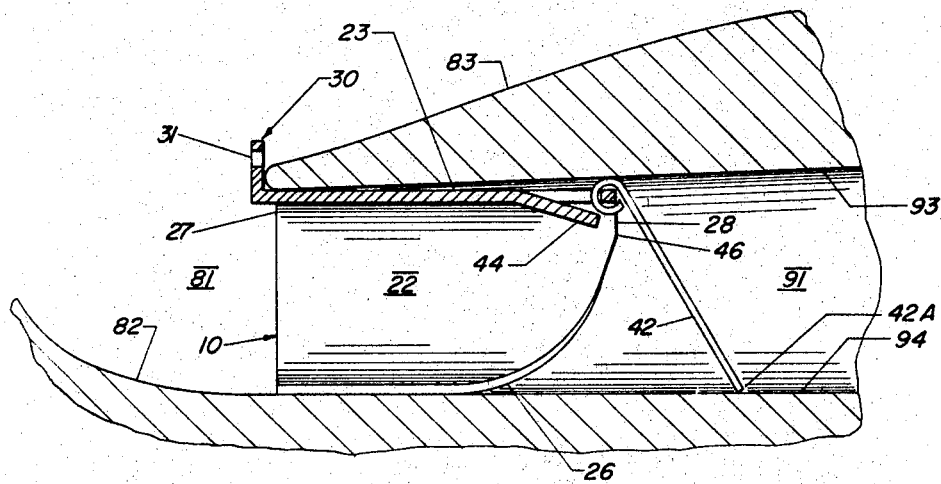
FIGURE 5 is an enlarged detail view of FIGURE 2 showing the embodiment 10 of the rodent barrier attachment positioned within the water closet discharge channel.
Figure 4:
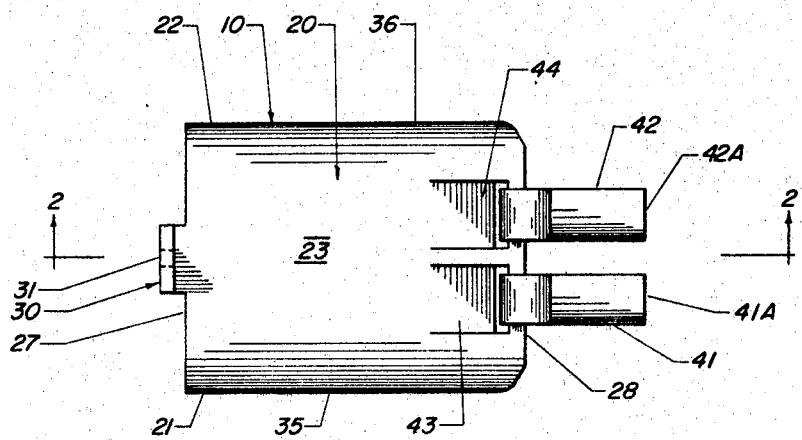
FIGURE 4 is a top plan view of the embodiment 10 of the rodent barrier attachment for water closets.
Figure 8:
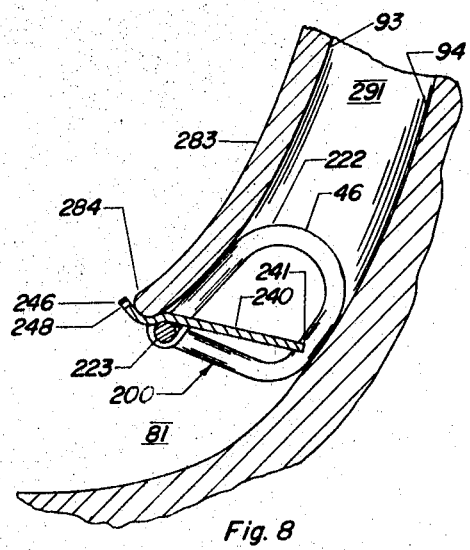
FIGURE 8 is a sectional elevational view taken along line 8—8 of FIGURE 7, similar to that of FIGURE 5, showing embodiment 200 of the rodent barrier attachment device positioned within a steeply inclined type water closet discharge channel.

Installation of rodent barrier attachment embodiment 200 is illustrated in FIGURE 8. The toilet bowl discharge channel 291 illustrated in FIGURE 8 has a much steeper incline than the discharge channels 91 illustrated in FIGURES 2, 5, and 9, said steeply-inclined discharge channel 291 of FIGURE 8 being indicative of the channels employed in those toilet bowls currently in vogue. However, rodent barrier embodiments 10, 100, and 200, are adapted to operate in both the steeply inclined channel 291 of FIGURE 8 and in the more nearly horizontal channel of FIGURES 2, 5, and 9. It can be seen in FIGURE 8 that the tongue-tab 246 provides both the means for retaining the device 200 near bowl lower opening 81 and the restraining means to limit the pivotal motion of pivotal tongue 240 toward the bowl lower opening 81. Since tongue-tab 246 abuts the rearward terminus 284 of bowl shelf 283, it functions as a retention means, and the same abutment position of tongue-tab 246 against bowl shelf 283 provides a restraining means to prevent the tongue 240 from being pushed rearwardly by an intrepid rodent.

Figure 9:
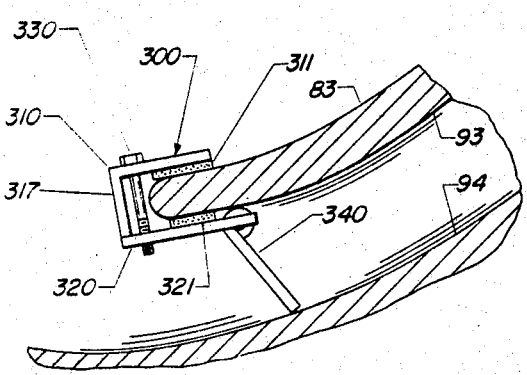
FIGURE 9 is a sectional elevational view similar to that of FIGURES 5 and 8 showing embodiment 300 of the rodent barrier attachment device positioned within a water closet discharge channel.

Although the embodiment 300 shown in FIGURE 9 represents an especially economical removably-attachable rodent barrier device, it is relatively conspicuous and tends to snag toilet bowl debris, especially tissue paper components thereof. Embodiment 300 is removably attached to the toilet bowl shelf 83 with a pair of relatively-movable substantially horizontal opposed plates (including upper plate 310 and lower plate 320) rather than being removably positioned against the throat sidewalls with a collar member as in the previously described embodiments 10, 100, and 200. The adjacent faces of opposed vertically offset plates 310 and 320 are of a roughened configuration, for example having integral layers 311 and 321 of water-resistant abrasives, whereby the plates are adapted to abrasively engage the opposed sides of toilet bowl shelf 83 including throat roof 93. Plates 310 and 320 are adapted to move toward each other, and the degree of pressure between plates 310 and 320 is regulated by means of vertical threaded bolt 330 threadedly engaged with both said plates 310 and 320. Upper plate 310 is of an L-shaped configuration including vertically-extending spacer arm 317 adapted to abut the face 321 of lower plate 320 whereby the plates 310 and 320 are maintained in substantial parallelism to enhance their abrasive engagement with shelf 83. Pivotal tongue 340 of embodiment 300 is pivotably attached to lower plate 320 in analogous fashion as tongue 141 is pivotably attached to collar web 123.

Structural materials for the device 10 have already been alluded to. Since the rodent barrier device 10 is subjected to various aqueous systems including acids, alkalis, bacteria, and organic materials in various states of decomposition, it is essential that the structural materials employed, whether they be resinous or metallic, be resistant to all these chemical effects.

From the foregoing, the construction and operation of the rodent barrier device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A rodent barrier attachment device adapted to be removably inserted into the discharge channel of a water closet of the type comprising a bowl having a lower opening and a discharge channel communicating with the lower opening of the water closet bowl, said rodent barrier attachment device comprising: an elongate collar member having two downwardly extending opposed legs and an intervening web, said opposed legs and intervening web being integrally joined together, the lower termini of the respective legs being spaced apart a finite distance to provide an internal elongate opening for said rodent barrier attachment device, at least one of said collar member opposed legs being resiliently deflectable toward the other leg, said collar member having a forward end and a rearward end, the ratio of the forwardly extending elongate length of the web to the maximum vertical height of the collar member being less than about 1, the ratio of the average elongate length of the collar member to the maximum vertical height of the collar member being greater than about ½, the inward surface of the collar member being free of vertical and of rearwardly-extending projections of the type adapted to snag solid components of toilet bowl debris, at least one tongue member being pivotably attached to the collar member and being positioned between the collar member legs, said at least one pivotal tongue being free to assume a substantially vertical position when the collar member is vertically supported from the rearward end with the collar member web being vertically disposed, and restraining means to limit the pivotal motion of said at least one tongue toward the collar member rearward end.

2. The rodent barrier attachment device of claim 1 wherein the ratio of the forwardly extending elongate length of the collar member intervening web to the rearward vertical height of the collar member is less than about 1; wherein both collar member opposed legs are resiliently deflectable toward each other; wrherein an upwardly extending tab is integrally connected to the collar member intervening web to provide at least a portion of a retention means for the rodent barrier attachment device; and wherein said at least one pivotal tongue is pivotably attached to the collar member intervening web nearer to the web forward end than to its rearward end, said at least one pivotal tongue being transversely wider than its thickness.

3. The rodent barrier atachment device of claim 2 wherein the collar member is formed of a structurally-continuous resiliently-deflectable sheet material so that the collar member legs will resiliently flex toward each other when subjected to an external manual pressure; wherein the lower forward portion of the collar member legs is truncated to facilitate insertion of the rodent barrier attachment device into the discharge channel of a water closet; wherein the upwardly extending tab auxiliary retention means is perforate to facilitate removal of the rodent barrier attachment device from said discharge channel; and wherein the length of said at least one pivotal tongue exceeds the maximum vertical height of the collar member, to provide a restraining means.

4. The rodent barrier attachment device of claim 1 wherein the forwardly extending elongate length of the collar members intervening web is less than the elongate length of the collar member legs; wherein the collar member including the legs and intervening web thereof is formed of a single piece of structurally-continuous resiliently deflectable material so that both collar member legs will resiliently flex toward each other when subjected to an external manual pressure; wherein an upwardly extending tab is integrally connected to the collar member to provide at least a portion of the retention means for the rodent barrier attachment device; and wherein said at least one pivotal tongue is pivatably attached to the collar member intervening web, said at least one pivotal tongue being transversely wider than its thickness.

5. The rodent barrier attachment device of claim 4 wherein the upwardly extending tab auxiliary retention means is integrally attached to the collar member intervening web at the rearward extremity of the collar member; wherein the forwardly extending length of the collar member intervening web to the vertical rearward height of the collar member bears a ratio less than about 1; wherein the lower forward portion of the collar member legs is truncated to facilitate installation of the rodent barrier attachment device into the discharge channel of a water closet; and wherein the upwardly extending tab auxiliary retention means is perforate to facilitate removal of the rodent barrier attachment device from said discharge channel.

6. The rodent barrier attachment device of claim 4 wherein the collar member comprises a single length of normally-springy permanently-bendable rod stock having a first end, a second end, an intermediate portion, and a substantially uniform cross-sectional shape, the said rod stock intermediate portion providing a collar member intervening web that extends transversely between the collar member opposed legs, the rod stock between its first end and the intermediate portion thereof and also between its second end and the intermediate portion thereof being permanently bent in loop form to provide skeletal type collar member legs.

7. The rodent barrier attachment device of claim 6 wherein the at least one pivotal tongue has an upper end that is nearer to the collar member web than is the tongue free end, said pivotal tongue including the upwardly extending tab auxiliary retention means between the collar member web and the tongue upper end.

8. The rodent barrier attachment device of claim 1 in removable combination with a water closet having a lower opening and a discharge channel communicating with the lower opening of the water closet bowl, the throat portion of said discharge channel sloping upwardly from the bowl to provide a water trap at the sump of said bowl, said bowl including a shelf member which provides a portion of the bowl sloping wall and also the roof of the discharge channel throat, the floor of the discharge channel throat merging with the sump of said bowl, said rodent barrier attachment device being removably positioned within the throat portion of the discharge channel adjacent to the lower opening of the water closet bowl, the collar member legs exerting reflex pressure against the discharge channel throat sidewalls between the throat floor and roof to provide a retention means, the collar member web being disposed at the discharge channel roof remote of the floor thereof.

9. In combination with a water closet comprising a bowl having a lower opening and a discharge channel communicating with the lower opening of the water closet bowl, the throat portion of said discharge channel sloping upwardly from the bowl to provide a water trap at the sump of said bowl, said bowl including a shelf member which provides a portion of the bowl sloping wall, a rodent barrier attachment device removably positioned within the throat portion of the discharge channel adjacent to the lower opening of the water closet bowl, said rodent barrier attachment device comprising a collar member having an interior opening, a rearward end, and a forward end that extends into said discharge channel, the collar member exerting reflex pressure against the discharge channel throat, the inward surface of the collar member being free of vertical and rearwardly-extending projections of the type adapted to snag toilet bowl debris, at least one tongue member that is attached to the collar member, said tongue member having a free end remote of the tongue member's attachment to the collar member, said tongue member free end being disposed forwardly of the collar member rearward end and within the discharge channel throat portion, the said at least one tongue member being transversely wider than its thickness, said at least one tongue member being free to open forwardly when subjected to a rearward force of toilet bowl debris, restraining means to limit the rearward motion of the at least one pivotal tongue toward the lower opening of the bowl, and an outwardly extending tab attached at the rearward portion of the collar member, said tab being positioned within the bowl and abutting the bowl shelf member to promote retention of the rodent barrier attachment device adjacent to the lower opening of the bowl and to facilitate removal of the rodent barrier attachment device from the water closet.

10. A rodent barrier attachment device adapted to be removably attached to the rearward terminus of the sloping shelf of a water closet of the type comprising a bowl having a lower opening and a discharge channel communicating with the lower opening of the water closet bowl, said bowl including a shelf member one side of which provides a portion of the bowl sloping wall and the other side of which provides the roof of the discharge channel throat, said rodent barrier attachment device comprising a pair of attached opposed substantially horizontal plates, including a lower plate and a vertically offset upper plate, said opposed plates being removably attached together with a vertical threaded bolt threadedly engaged with both said horizontal plates whereby said vertical threaded bolt provides a means for controllably vertically moving said horizontal plates relative to each other, and at least one tongue member pivotably attached to the lower plate, the said at least one pivotal tongue member being free to assume a downwardly extending vertical position when the opposed plates are vertically suspended above said tongue member.

11. The rodent barrier attachment device of claim 10 wherein at least one of the opposed horizontal plates includes a vertically-extending spacer arm adapted to abut the other horizontal plate; and wherein at least one of the adjacent faces of the said opposed horizontal plates is of a roughened configuration whereby said at least one plate is adapted to abrasively engage one of the respective sides of the shelf member at the rearward terminus thereof.

(References on following page)

References Cited

UNITED STATES PATENTS

| | | | |
|---|---|---|---|
| 251,767 | 1/1882 | Daniell | 4—76 |
| 292,035 | 1/1884 | Morrison | 43—65 |
| 344,141 | 6/1886 | Shoults | 43—65 |
| 604,117 | 5/1898 | Latshaw | 137—527.8 |
| 814,788 | 3/1906 | Lenhart | 137—454.2 |
| 906,562 | 12/1908 | Rue | 43—65 |
| 1,239,319 | 9/1917 | Vampa | 4—89 |
| 1,397,471 | 11/1921 | Walker | 43—61 |
| 1,811,611 | 6/1931 | Carlson | 210—116 |
| 2,089,141 | 8/1937 | Wassermann | 137—247.19 |
| 2,038,494 | 6/1962 | Gulick | 161—149 |
| 3,047,013 | 7/1962 | Baumbach | 137—525.1 |

LAVERNE D. GEIGER, *Primary Examiner.*

H. K. ARTIS, *Assistant Examiner.*